June 15, 1943.                    C. E. SAVAGE                    2,321,862
                            DRAFTING INSTRUMENT
                              Filed July 13, 1942
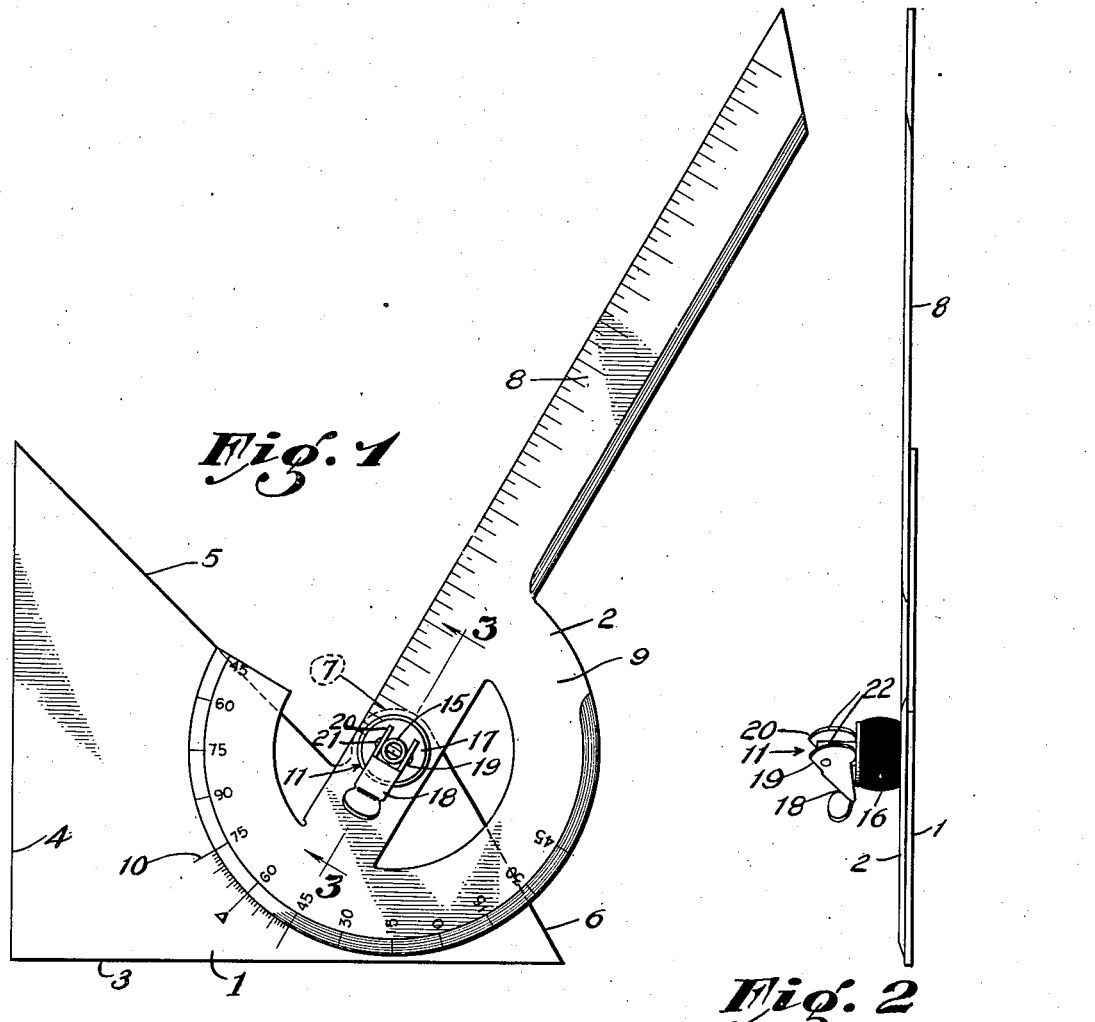
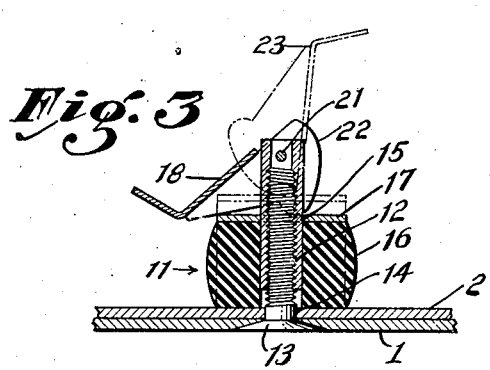
Inventor,
CHARLES E. SAVAGE
By
Attorney.

Patented June 15, 1943

2,321,862

UNITED STATES PATENT OFFICE 2,321,862

DRAFTING INSTRUMENT

Charles E. Savage, Santa Monica, Calif.

Application July 13, 1942, Serial No. 450,654

4 Claims. (Cl. 33—93)

This invention relates to navigation instruments.

Specifically, the navigation instrument contemplates in one embodiment a scale graduated in degrees, which is revolubly mounted with respect to a second instrumentality, such as a triangle and which scale may be adjusted relative to indications on the triangle and then locked when so adjusted.

This instrument is useful in the solving of ground speed, wind speed, distance traveled, flying time, and may be used as a protractor, a pelorus, a linear scale, and a graphic computer.

Other objects of the invention include a device which is simple of structure, inexpensive in cost of manufacture, and generally superior to devices now known to the inventor.

In the drawing:

Figure 1 is a plan view of an instrument embodying the invention,

Figure 2 is an elevation of the invention, and,

Figure 3 is an enlarged fragmentary section on the line 3—3 of Figure 2.

Referring now to the drawing, I have provided two drafting instruments 1 and 2, which may be formed of transparent material, the member 2 being rotatable relative to member 1. The member 1 may constitute a trangle having two right angularly related edges 3 and 4, an edge 5 at a substantially 45° angle to the edge 4, and an edge 6 at a substantially 60° angle to the edge 3. The edges 5 and 6 merge with a curved edge 7.

The member 2 includes a ruler portion 8 and a protractor portion 9. The ruler 8 extends diametrically of the protractor portion, as illustrated in Figure 1. In the present instance, the protractor is not in the form of a closed circle, although it may be so made. Furthermore, the degrees adjacent the edge of the protractor may be changed in accordance wtih the use of the invention. In the present instance, the protractor is divided from 0 to 45° for a portion thereof; from 0 to 90° for another portion, followed by a decrease in the degree markings, to-wit, from 90° to 45°. The triangle 1 is provided with 1° graduations at 10.

In order to secure members 1 and 2 in working relationship, I have provided means designated generally as 11. The said means includes a screw 12 provided with an enlarged base 13, the said base being confined in the member 1 so that the outer surface of said base is flush with the bottom surface of the triangle, as see Figure 3. The screw is passed through an opening 14 in member 2, and specifically the ruler portion which diametrically spans the protractor portion 9. Adapted for engagement with the threads of said screw is a threaded sleeve 15, and surrounding said threaded sleeve is a resilient member 16 and a perforated disc 17. The member 16 is interposed between the top surface of the member 2 and the disc 17.

A feature of the present invention consists in the means for permitting or preventing relative rotation between members 1 and 2. This means includes screw 12, sleeve 15, resilient member 16, disc 17, and a lever 18. Lever 18 is provided with two wings 19 and 20 adapted to be diametrically positioned relative to the sleeve 15 and secured thereto by pin 21. Each wing is provided with a cam edge 22.

When the lever 18 is moved to the dotted line position 23 (Figure 3) the adjustment between screw 12 and sleeve 15 is so regulated that member 16 is not compressed between disc 17 and the top surface of member 2. Upon moving the lever 18 from dotted line position 23 to full line position (Figure 3), the member 16 is compressed by the cam wings of the lever between the surface of member 2 and the disc 17. Compression of member 16 by rotation of the lever 18 draws sleeve 15 and screw 12 upwardly, binding members 1 and 2 together adjacent their pivot point and results in a frictional engagement between the base of member 16 and the surface of the member 2.

The operation, uses, and advantages of the invention are undoubtedly clear to those having need for a device of this character. It may be pointed out that if a navigator is plotting a course, this instrument may be placed upon a drawing board and against a T-square. The lever 18 may be moved to the dotted position 23 and the member 2 revolved to any selected degree, whereupon the lever 18 may be quickly moved from its dotted line position in Figure 3 to its full line position, to the end that the navigator may draw a line, using the ruler. Any other angularity may be quickly selected and the members locked together. When it is realized that vibration is usually extensive in aircraft during movement thereof, an instrumentality that permits ready adjustment thereof under adverse operating conditions becomes valuable for the true plotting of courses and the calculation of other angles so necessary to the determination of a course to be followed.

In navigation, the zero graduation on the protractor would be where 90° now appears in the drawing, and the remaining degrees would run clockwise to 360°. By placing the sides of the triangle on the parallels and meridians of an air chart, the ruler will automatically give a reading in degrees through any two points. By using similar lines in plotting, any line may be established as true north and any line parallel to true north and coinciding with edge 4 of the triangle will give the angle sought by rotating the protractor relative to the triangle.

This instrument may be used as a standard drafting instrument on any drawing board in conjunction with a T-square in making architectural, machine or other kinds of drawings.

I claim:

1. In a device of the character disclosed, two transparent drafting instruments, a pivot therebetween whereby there may be relative rotation between said instruments, a cam lever secured to said pivot, and a resilient member between said cam lever and one of said instruments, movement of said cam lever in one direction compressing said resilient member causing binding engagement between said two drafting instruments to prevent relative rotation therebetween.

2. In a device of the character disclosed, two drafting instruments, a pivot between said instruments, said pivot including a screw-threaded shank, a threaded sleeve carried on said shank, a resilient member surrounding said sleeve and bearing against the surface of one of said instruments, and a cam lever pivoted to the sleeve for compressing said resilient member to cause it to have binding engagement with one of said instruments and to prevent relative rotation between the said instruments.

3. In a device of the character disclosed, two drafting instruments pivoted together, said pivot comprising an elongated screw provided with a base counter-sunk in a first of said instruments, a threaded sleeve carried by said screw, a cam lever pivoted to the sleeve, a disc, and a resilient member surrounding said sleeve and interposed between said disc and a surface of a second of said drafting instruments, movement of said cam lever in one direction compressing said resilient member and binding the first and second drafting instruments together adjacent the pivot point to prevent rotation therebetween.

4. A navigator's instrument comprising a triangle, a protractor provided with a rule overlying said triangle, a pivot between said rule and triangle, a resilient member surrounding the pivot and bearing against the rule, and means for moving said pivot upon compression of said resilient member to cause frictional engagement between the rule and triangle at the zone of said pivot to prevent relative rotation between the protractor and triangle.

CHARLES E. SAVAGE.